United States Patent Office.

CHARLES GAUDIN, ZOÉ GRANIER, AND JULES GRANIER, OF SAN FRANCISCO, CALIFORNIA.

Letters Patent No. 79,903, dated July 14, 1868.

IMPROVED FIRE-KINDLING.

The Schedule referred to in these Letters Patent and making part of the same.

TO ALL WHOM IT MAY CONCERN:

Be it known that we, CHARLES GAUDIN, ZOÉ GRANIER, and JULES GRANIER, of San Francisco, in the county of San Francisco, and State of California, have invented a new and improved Fire-Kindling; and we do hereby declare that the following is a full, clear, and exact description thereof, which will enable others skilled in the art to make and use the same.

This invention relates to an improvement in fire-kindling, and it consists in forming a ball of saw-dust, mixed and saturated with inflammable materials, upon the end of a wick impregnated with camphene, or other inflammable liquid, and covered with resin.

By means of this wick a small strip is presented to be lighted, and consequently will ignite with much more facility than the ordinary round kindling.

In preparing the kindling, we take any convenient amount of saw-dust, and thoroughly mix with it a suitable quantity of resin, saltpetre, and sulphur.

A sufficient quantity of coal-tar is then added to reduce the mixture to a proper consistency. The compound, after being thoroughly mixed and worked together, is then rolled into a ball upon the end of a strip of wicking impregnated with camphene, or other inflammable liquid, and covered with a coating of resin.

We are aware that balls of fire-kindling have been formed of saw-dust saturated and mixed with inflammable substances, but never to our knowledge have they been formed upon the end of a wick in such a manner as to present through said wick a small point to be readily ignited.

Having thus described our invention, what we claim as new, and desire to secure by Letters Patent, is—

Forming a fire-kindling ball upon the end of an inflammable wick for the purpose of ready ignition, as herein shown and described.

The above specification of our invention signed by us, this 18th day of September, 1867.

CH. GAUDIN,
ZOÉ GRANIER,
JULES GRANIER.

Witnesses:
A. G. BIERCE,
EDW. GEO. GRAY.